N. RODGERS.
Shovel Plow.
No. 30,763.
Patented Nov. 27, 1860.
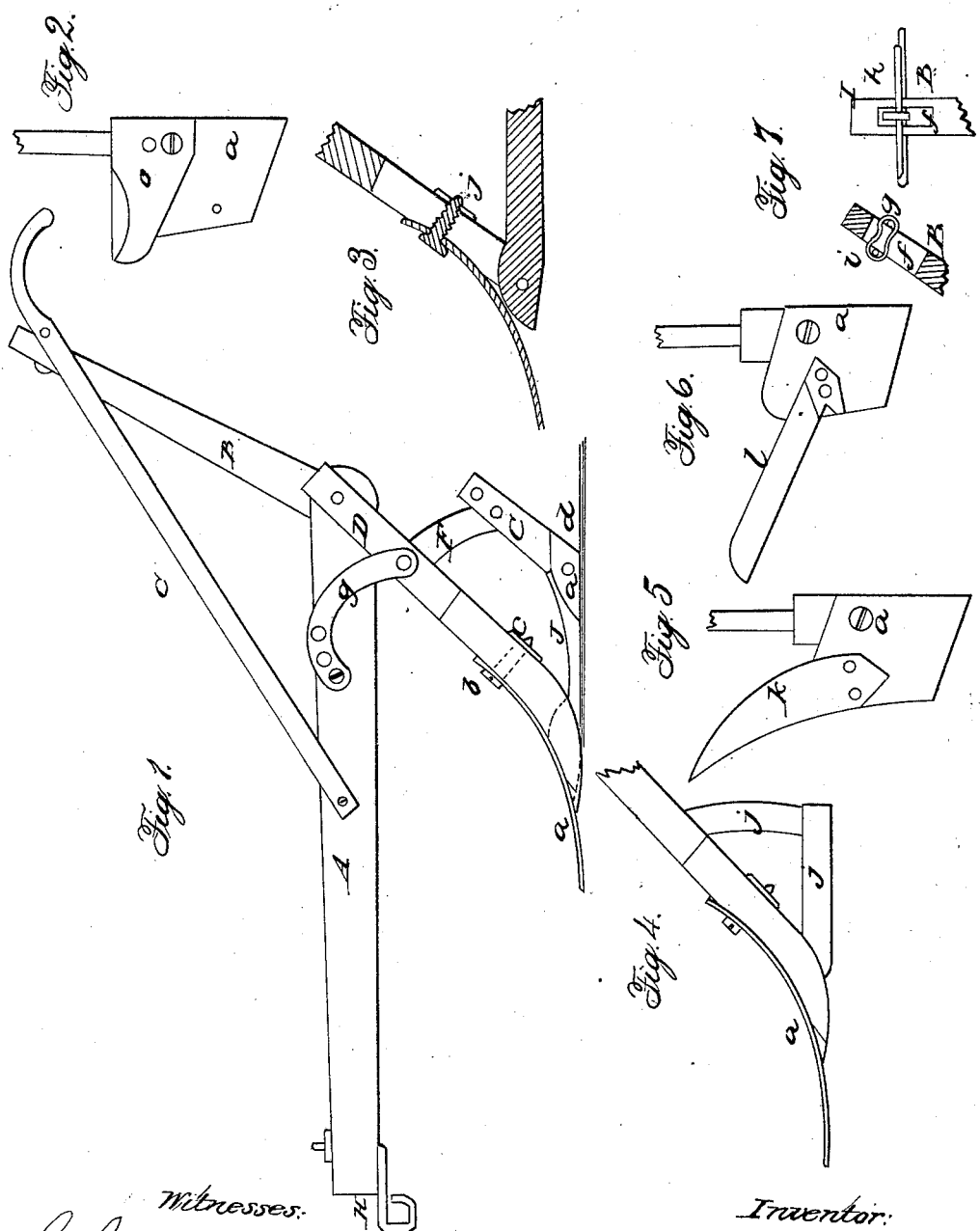

UNITED STATES PATENT OFFICE.

NOAH ROGERS, OF THOMAS COUNTY, GEORGIA.

IMPROVEMENT IN COTTON-CULTIVATORS.

Specification forming part of Letters Patent No. 30,763, dated November 27, 1860.

*To all whom it may concern:*

Be it known that I, NOAH ROGERS, of Thomas county, in the State of Georgia, have invented new and useful Improvements in Cotton Cultivators; and I do hereby declare that the following is a full and exact description thereof, reference being had to the accompanying drawings and the letters of reference marked thereon.

Figure 1 is a side elevation of the plow. Fig. 2 is a section with a different attachment. Figs. 3, 4, 5, and 6 are sections with different scrapers or weeders attached; Fig. 7, sections showing the adjustment of the standard to handles with link for attach-pin.

To enable others skilled in the art to make and use my invention, I will describe its construction and operation.

In Fig. 1, A' is the clevis. A is the beam; B, the upper standard; C, the handles; D, the lower standard, to which is attached the shovel-weeders, &c.; E, the rear standard, to which is attached the scraper $d$; $a$, the shovel-scraper; $b$, the screw by which it is attached to standard D; $c$, the nut of said screw; F, an adjustable metallic supporter to standard E, and which is intended for raising and lowering the scrapers $d$. It will be seen that brace $g$ is also adjustable, and is to raise or lower the front of the plow, setting it deeper or shallower, as may be desired. By means of the elongated slot $f$, link $g'$, rung $h$ of handle C, and pin $i$ this link can be raised or lowered in slot $f$, when it allows the rung $h$ to fall or rise, as required.

Fig. 2 is a section of plow with $a$ and standard D, with additional attachment $i$ fastened to the shovel.

Fig. 3 is a vertical section of shovel $a$, standard D, and bar $j$, showing how attached.

Fig. 4 is a side view of the same facts as in Fig. 3.

Fig. 5 is a front view of shell $a$ and standard D, wing $k$ attached to the shovel $a$.

Fig. 6 is a section of same parts as Fig. 5, with wing $k$ attached.

Fig. 7 is sections of standard B with slot $f$ and link $g'$ and rung $h$.

In operating my plow I make the changes, as specified, to accommodate the plow to the different kinds of work I wish to do with my plow. When I wish to cultivate corn or cotton when small I attach to the shovel scraper $o$, which by its curved shape will catch the ground and prevent it from falling over the young plants, and thus prevent it being covered up. The bar and brace $j$ in Figs. 4 and 3 is attached for the purpose of raising and lowering the shovel by means of the different holes in brace $j$. The weeders $k$ in Fig. 5 is for throwing the ground up to the plant when it is higher than when the scraper $o$ is used, the scraper $l$ in Fig. 6.

Having thus described the nature of my invention, what I claim, and desire to secure by Letters Patent, is—

The arrangement of the handles C, standard B, with slot $f$, rung $h$, link $j'$, pin $i$, standard D, adjustable braces $g$ and F, mold-board $a$, wings $k$ and $l$, and movable pieces $j$ and $j'$, the whole operating as set forth.

In testimony whereof I hereunto set my hand and seal.

NOAH ROGERS. [L. S.]

Witnesses:
 JOHN M. DYRON,
 R. R. EVANS.